United States Patent [19]

Ford, Jr.

[11] 3,859,459

[45] Jan. 7, 1975

[54] FM DEMODULATOR CIRCUIT FOR A FACSIMILE SYSTEM

[75] Inventor: Herbert P. Ford, Jr., Orlando, Fla.

[73] Assignee: Exxon Research and Engineering Company, Linden, N.J.

[22] Filed: Feb. 16, 1973

[21] Appl. No.: 332,925

[52] U.S. Cl................... 178/6, 178/66, 178/DIG. 7, 325/320, 329/122

[51] Int. Cl......... H03d 3/00, H04b 1/16, H04n 1/40

[58] Field of Search.......... 178/DIG. 7, 6, 7.3 R, 66, 178/67; 325/320; 329/122

[56] References Cited

UNITED STATES PATENTS

| | | | |
|---|---|---|---|
| 3,353,101 | 11/1967 | Kawai | 178/67 |
| 3,467,772 | 9/1969 | Crane | 178/7.3 R |
| 3,525,945 | 8/1970 | Puente | 325/320 |
| 3,591,711 | 7/1971 | DeGroat | 178/6 |
| 3,737,578 | 6/1973 | Matsuo | 178/67 |

*Primary Examiner*—Howard W. Britton

[57] ABSTRACT

FM signals within a predetermined bandwidth represent dark-light variations in a document transmitted over a communications network to a facsimile receiver. Demodulation of the FM signals is accomplished by a phase locked loop comprising a doubly balanced modulator and a voltage controlled oscillator. The fundamental FM frequencies which are applied to the doubly balanced modulator are doubled to permit attenuation of the doubled fundamentals without adversely affecting the high frequency variations in the demodulated signal.

10 Claims, 5 Drawing Figures

FM DEMODULATOR CIRCUIT FOR A FACSIMILE SYSTEM

RELATED APPLICATIONS

Certain aspects of the facsimile apparatus disclosed herein are also disclosed in the copending applications of Richard L. Nelson, Ser. No. 333,616 filed Feb. 20, 1973 and Ser. No. 333,615 filed Feb. 20, 1973, abandoned in favor of continuation-in-part application Ser. No. 412,989 filed Nov. 5, 1973 which are assigned to the assignee of this invention.

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical informationbearing signals representing the dark-light variations in the document being scanned. These information signals are then transmitted over the communications network to a facsimile receiver where the information-bearing signals are converted to marks or images on a copy medium so as to form a copy which is a reasonable facsimile of the original document.

In several commercially available facsimile systems, the information-bearing signals which are transmitted over the communications network are FM (frequency modulated) signals. In general, these signals lie in an FM bandwidth of 1,500 Hz. to 2,400 Hz. which represents an audio range which is transmittable over ordinary telephone lines. Where this frequency range is utilized, the 1,500 Hz. signal usually represents a "white" level, the 2,400 Hz. signal represents a "black" level and signals in the frequency range between 1,500 Hz. and 2,400 Hz. represent varying degrees of "gray."

The use of this particular FM bandwidth, while convenient because of the use of conventional telephone lines for transmission, does present some difficulties at the facsimile receiver where demodulation of the FM signals occur, in particular, there is considerable difficulty in filtering the demodulated signal at the facsimile receiver, especially at the low end of the bandwidth, since high frequency variations in the demodulated signal do approach the low end of the bandwidth, i.e., 1,500 Hz. As a result, attenuation of the FM fundamentals at the low end of the bandwidth can result in substantial attenuation of the high frequency variations in the demodulated signal unless expensive and selective filtering circuitry is utilized. This problem becomes particularly critical where high speed, high resolution transmissions of information are utilized to make full use of the available bandwidth on conventional telephone lines.

In order to overcome these filtering difficulties, the prior art has suggested the use of frequency doubling at the receiver to achieve a wider separation between the high frequency variations in the demodulated signal and the lowest FM signal frequency. In other words, the signals at the low end of the bandwidth, i.e., 1,500 Hz., after doubling to a frequency of 3,000 Hz. are sufficiently separated from the high frequency variations in the demodulated signal which will approach 1,500 Hz. so as to permit adequate filtering of the FM signal without substantial attenuation of the high frequency changes in the demodulated signal. The frequency doubled FM signal is then applied to an FM demodulator. Such a system is shown in U.S. Pat. No. 3,467,772 — Crane, where the FM demodulator comprises parallel monostable multivibrator circuits which are triggered by the frequency doubled FM signals.

SUMMARY OF THE INVENTION

It is an overall object of the invention to provide a demodulating circuit for a facsimile receiver which permits the filtering of FM signals without substantially attenuating the high frequency variations in a demodulated signal.

It is another object of this invention to achieve this result without resorting to expensive filter circuitry.

In accordance with these and other objects, a facsimile receiver comprises a phase locked loop including a voltage controlled oscillator and a phase detector which inherently multiplies the frequency of the signals applied to one of two inputs. A filter is then coupled to the output of the phase locked loop to attenuate frequencies corresponding to a multiple of the fundamental frequencies applied to the inputs of the detector without substantially attenuating frequencies less than the lower fundamental frequency applied to the inputs of the detector. Writing means are then coupled to the output of the filter means for writing on a copy medium information representing the information content of a document located at the transmitter.

In a preferred embodiment of the invention, a doubly balanced modulator is utilized as the detector in the phase locked loop which doubles the fundamental frequencies of the FM signals applied to the phase locked loop. Where an FM bandwidth of 1,500 Hz. to 2,400 Hz. is utilized, the doubly balanced modulator doubles these frequencies to a bandwidth of 3,000 Hz. to 4,800 Hz. A filter substantially attenuates frequencies in the range of 3,000 Hz. to 4,800 Hz. without substantial attenuation of the high frequency changes in the demodulated signal which approach 1,500 Hz.

In another preferred embodiment of the invention, the foregoing receiver circuitry is incorporated in a transceiver where the voltage controlled oscillator is also utilized to generate the FM signals when the transceiver is operating in a transmitting mode. In this connection, switch means may be provided to alternately connect and disconnect the voltage controlled oscillator from the phase locked loop.

Figure 1:
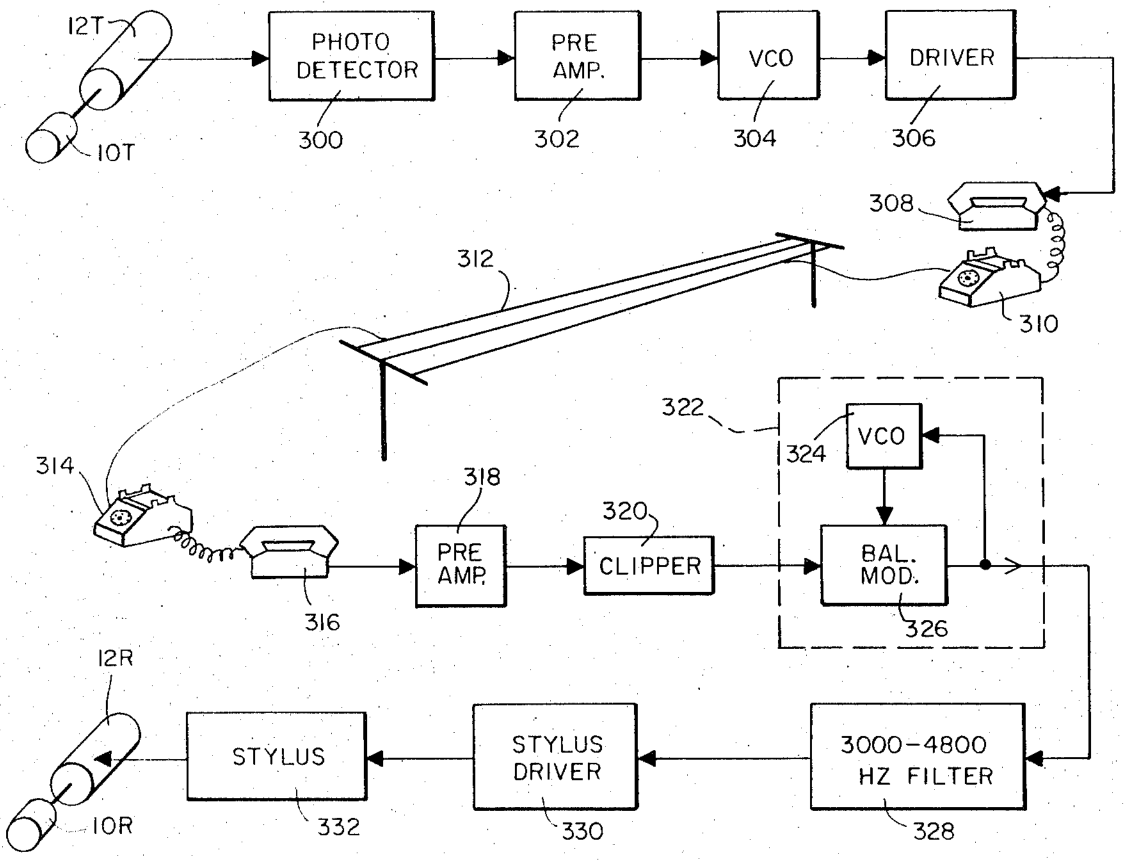
FIG. 1 is a block diagram of a facsimile system depicting one embodiment of the invention.
Figure 3:
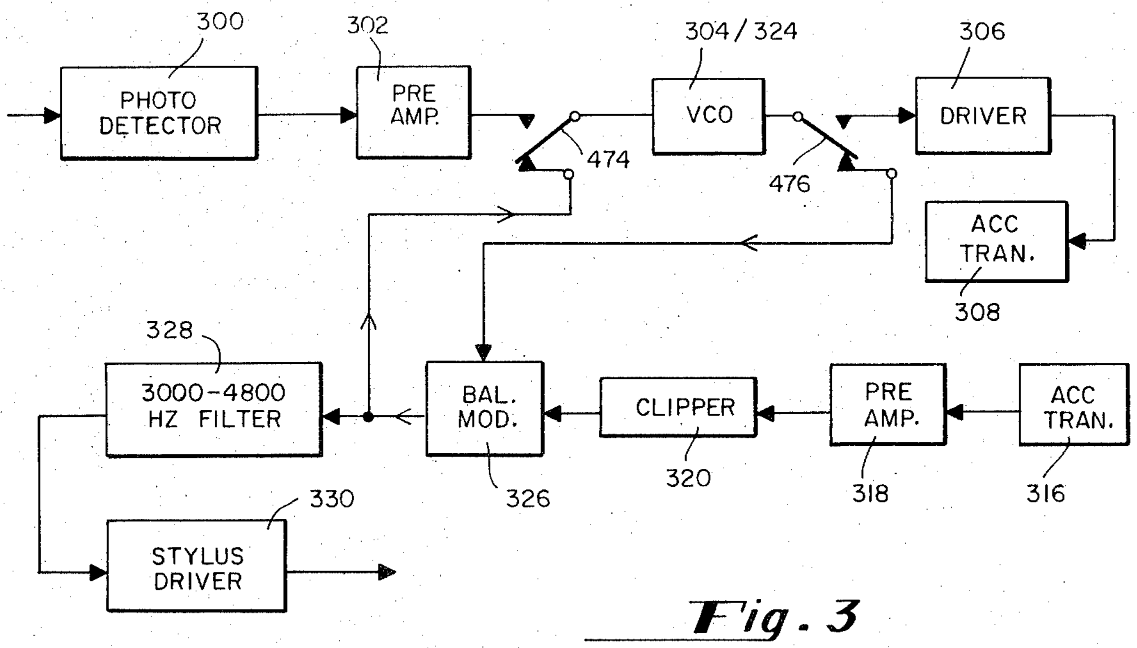
Figure 4:
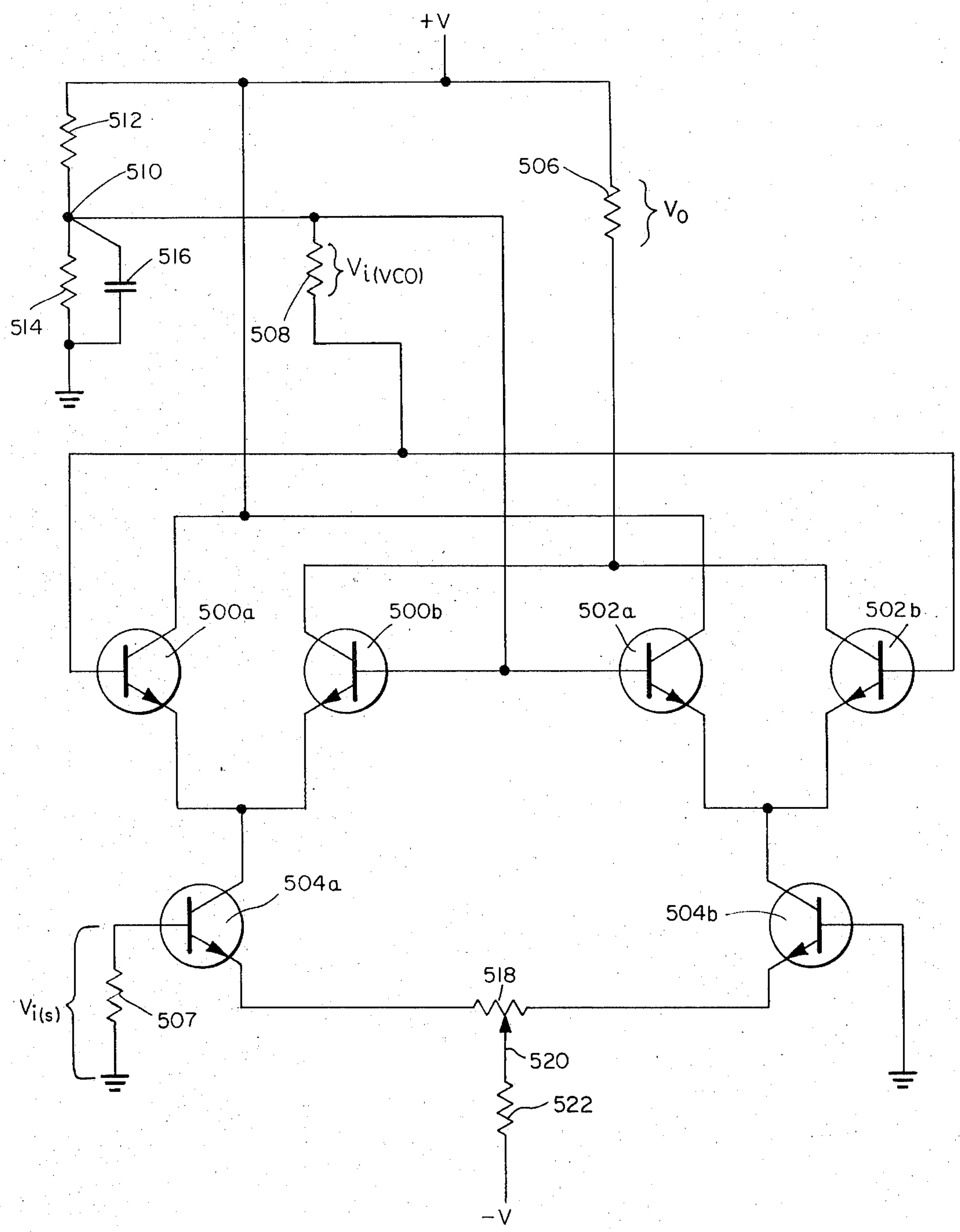

FIGS. *2a* and *2b* are schematic diagrams of circuitry for a transceiver capable of performing the transmitting and receiving function depicted in FIG. 1;

FIG. 3 is a block diagram of another transceiver embodying the invention; and FIG. 4 is a schematic diagram of a doubly balanced modulator which may by utilized in the transceiver of FIGS. 1, *2a*, *2b* and 3.

DETAILED DESCRIPTION OF A PREFERRED EMBODIMENT

Referring now to the facsimile system shown in FIG. 1, a facsimile transmitter comprises a drum 12T rotated by a motor 10T. As a scanning head (not shown) is advanced axially along the drum 12T and the drum rotates about its axis, successive paths on the document are illuminated and the variations in light intensity due to the reflectivity and transmissivity of the document are sensed by a photodetector 300. The photodetector 300 then converts these variations in light intensity which are a function of the reflectivity or transmissivity of the scanned document into electrical signals. These electrical signals are amplified at a preamplifier 302 and utilized to control a VCO (voltage controlled oscillator) 304 to generate frequency modulated signals representing the information content of the document carried by the drum 12T. The frequency modulated signals are then amplified by a driver 306 before being applied to an acoustical coupler 308 which is associated with a conventional telephone handset 310.

The frequency modulated carrier is transmitted by suitable means such as conventional telephone lines 312 to a receiver which is coupled to another conventional telephone handset 314 and an associated acoustical coupler 316. The receiver includes a preamplifier 318 for amplifying the frequency modulated carrier and a clipper 320 which eliminates variations in the amplitude of the frequency modulated signal.

In accordance with this invention, the clipped, frequency modulated signal is received and applied to a phase locked loop 322 including a voltage controlled oscillator 324 and a phase detector comprising a doubly balanced modulator 326 having a pair of balanced inputs with the frequency modulated signal from the clipper 320 applied to one input and the output of the voltage controlled oscillator which is coupled to the output of the balanced modulator 326 applied to the other input. A notch type filter 328 is coupled to the output of the phase locked loop 322 so as to attenuate frequencies in the 3,000 Hz. – 4,800 Hz. range. Since, in this embodiment, the minimum fundamental frequency of the frequency modulated signal is 1,500 Hz. which the phase locked loop including the balanced modulator 326 inherently doubles, the notch filter 328 is effective to remove the fundamental frequency of the frequency modulated signal from the demodulated DC signal which is applied to a stylus driver 330. However, the filter 328 does not attenuate those frequencies approaching 1,500 Hz., frequencies which correspond to rapid fluctuations in the demodulated DC signal as required for rapid transmission of and high resolution in the copy which is formed by marking on a copy medium with a stylus 332 as the copy medium is moved by rotating a drum 12R by motor 10R while a head moves to scan successive paths on the copy medium.

Figure 2A:
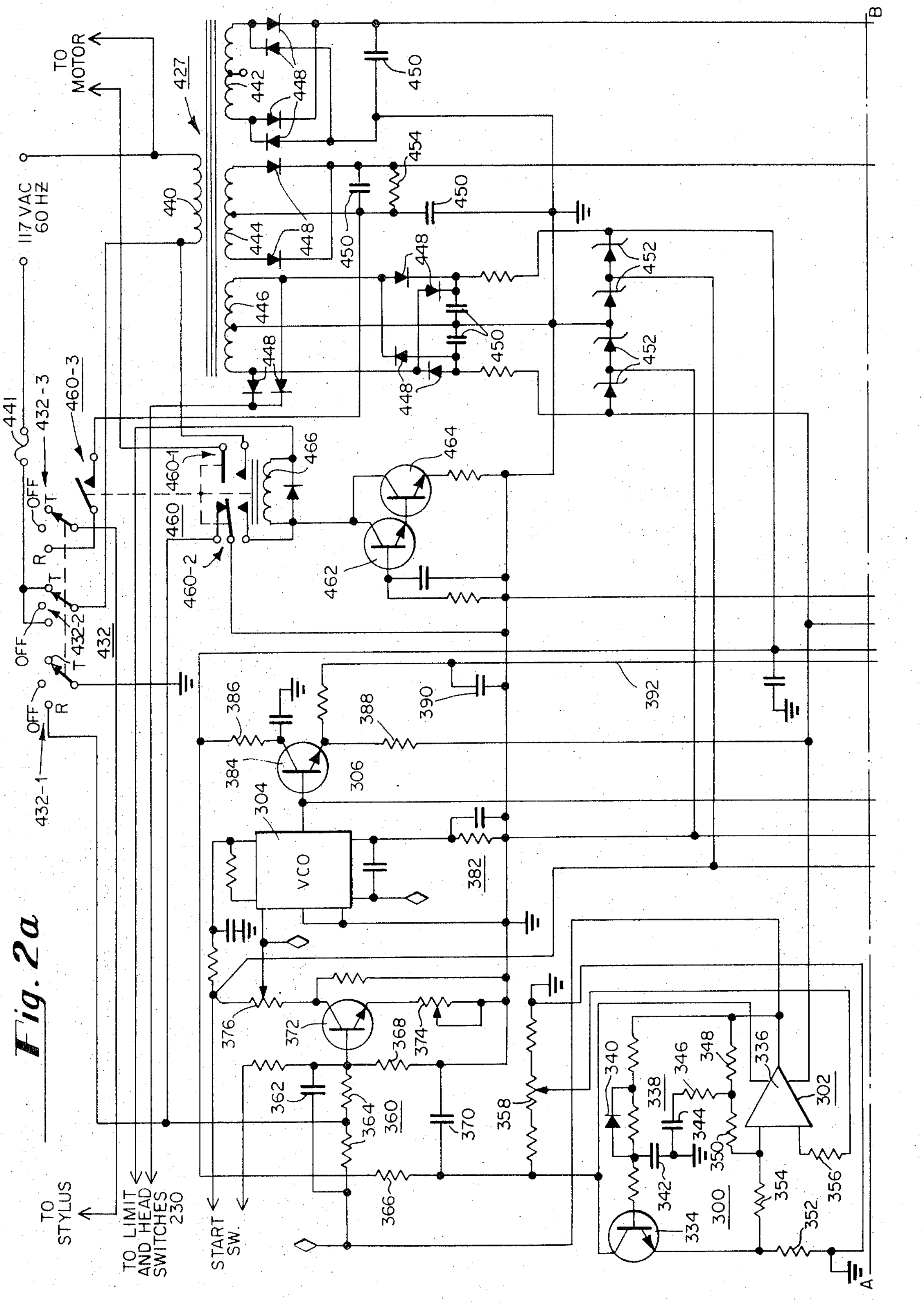
Figure 2B:
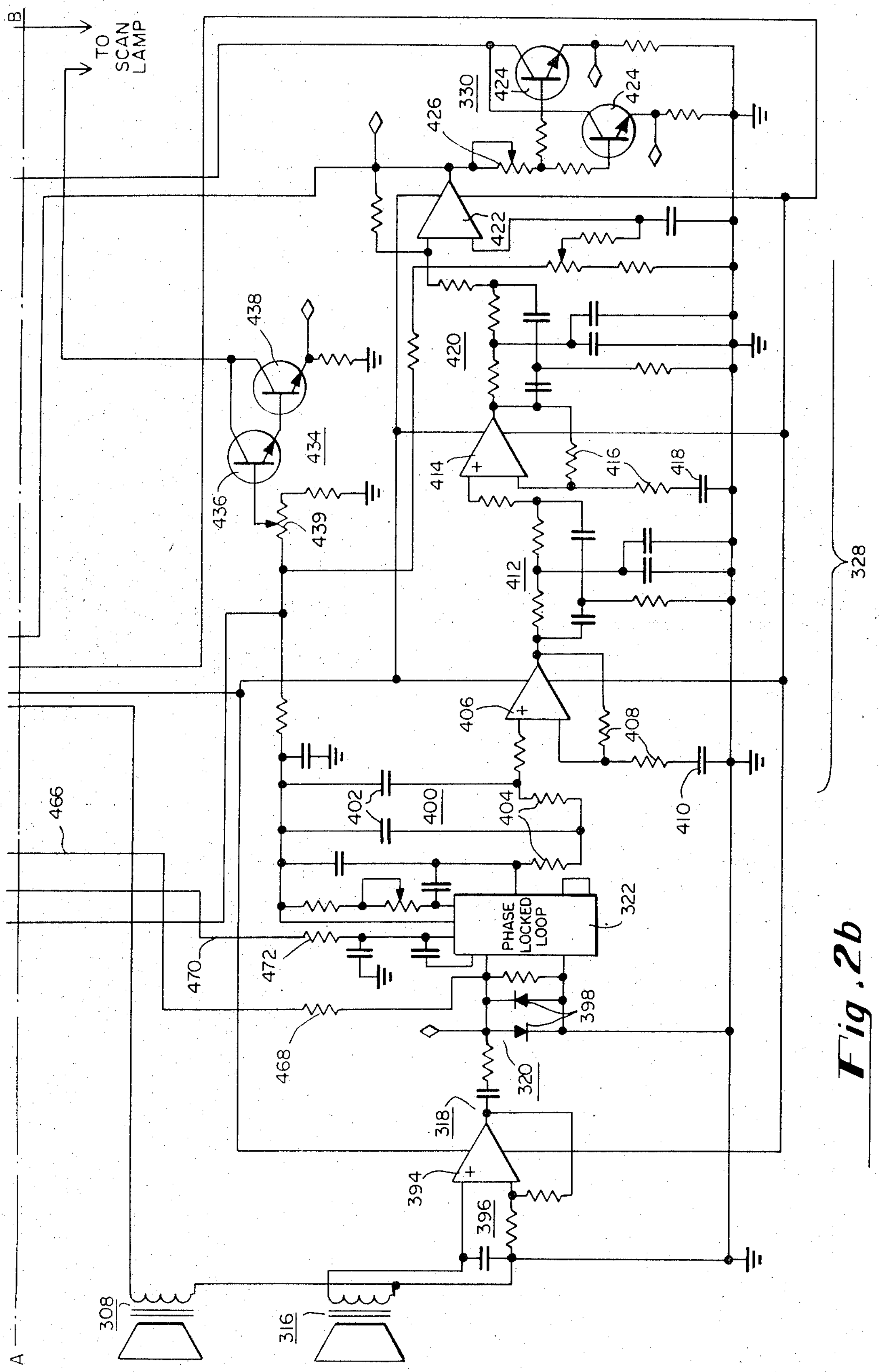

Reference will now be made to FIGS. 2a and 2b which show transceiver circuitry capable of performing the transmitting and receiving function depicted in block diagram form in FIG. 1. Referring first to the transmitting circuitry, the photodetector 300 comprises a phototransistor 334 having its emitter connected to the inverting terminal of an operational amplifier 336 in the preamplifier 302. The base of the transistor 334 is connected to the output of the operational amplifier 336 through a soft clamp circuit 338 which includes a diode 340 and a capacitor 342. When white is detected at the document causing a phototransistor 334 to conduct, the capacitor 342 is charged. When black is detected, the phototransistor 334 does not conduct and the diode 340 prevents the feedback from the operational amplifier 336 from discharging the capacitor 342 thus causing a generalization of white peaks. A high frequency peaking circuit comprising a capacitor 344 and a resistor 346 is also provided. The resistor 346 is connected to feedback resistors 348 and 350 which, along with resistors 352, 354, and 356, determine the DC level corresponding to white. This DC level may be adjusted by a preamplifier bias control comprising a potentiometer 358.

The DC signal representing black or white (or the various levels of gray in between) is then applied to a high frequency peaking circuit 360 comprising a capacitor 362 connected in parallel with resistors 364. The high frequency peaking circuit also comprises resistors 366, 368 and a capacitor 370. The output of the high frequency peaking circuit is applied to the base of a transistor 372 which is on when a black signal of +1.5 volts is applied to its base and is off when a white signal of 0.5 volts is applied to its base. Black limit and white limit potentiometers 374 and 376 are provided in the emitter and collector circuits respectively of the transistor 372.

When the transistor 372 is off corresponding to a white signal, the VCO 304 is appropriately biased so as to run at a frequency of 1,500 Hz. When black is detected at the photodetector 300 and the transistor 372 is on, the VCO is appropriately biased to run at a frequency of 2,400 Hz. When various levels of gray are detected, the frequency lies between 1,500 Hz. and 2,400 Hz. The VCO has been shown in block diagram form since the circuitry of an appropriate VCO is well known and may be purchased in integrated circuit form. In this connection, the VCO of the NE 565 integrated circuit phase locked loop manufactured by Signetics Corp. has been found to be particularly suitable. A power supply filter 382 is utilized in conjunction with the VCO 304.

The output of the VCO 304 is applied to the base of a transistor 384 of the driver 306 which is connected in an emitter follower configuration. The collector and emitter of the transistor 384 are appropriately biased by resistors 386 and 388 with a capacitor 390 being provided to equalize the response at the high and low frequencies provided by the VCO 304. The output from the driver transistor 384 is applied over line 392 to the acoustical coupler 308 for transmission over the line 312 shown in FIG. 1. When the transceiver is operated in a receiving mode, the acoustical coupler 316 will convert the acoustical signal to an electrical signal which is applied to an operational amplifier 394 of the preamplifier 318 which includes an RC network 396 for equalizing the response for frequencies from 1,500 Hz. to 2,400 Hz. Variations in the amplutide of the signal at the output of the operational amplifier 394 are eliminated by diodes 398 of the clipper circuit 320. After clipping, the 1,500 Hz. – 2,400 Hz. signals are applied to the phase locked loop 322 which is shown in block diagram form. Once again, the phase locked loop may be in integrated circuit form and the NE 565 chip manufactured by Signetics Corp. has been found to be particularly well suited for this purpose.

In order to eliminate the sharp edges on the double frequency square wave signals at the output of the phase locked loop 322, a ladder filter 400 is provided. The filter 400 which includes capacitors 402 and resistors 404 is connected to the input of the notch filter 328 which removes high frequency, 3,000 Hz. – 4,800 Hz. components which result from the doubling of the fundamental frequency of the 1,500 Hz. – 2,400 Hz. signals applied to the phase locked loop 322.

The filter 328 comprises a first operational amplifier 406 having its non-inverting terminal connected to the output of the ladder filter 400. A 1,000 Hz. peaking circuit comprising resistors 408 and a capacitor 410 are connected to the inverting terminal of the operational amplifier 406. The output of operational amplifier 406 is connected to a filter network 412 which is effective to substantially attenuate frequencies in the range of 4,800 Hz. The output from the network 412 is applied to another operational amplifier 414 having a 1,000 Hz. peaking circuit comprising resistors 416 and a capacitor 418. Another filter network 420 is provided at the output of the operational amplifier 414 for substantially attenuating frequencies in the range of 3,000 Hz. The output of this network is applied to the inverting terminal of another operational amplifier 422 which has a DC gain of approximately ten (10).

The signal is then applied to the driver 330 which is a current generator comprising transistors 424 having their bases coupled to the output of the operational amplifier 422 through a base current limiting potentiometer 426. Preferably, the potentiometer 426 is set so that 0 volts corresponds to white and 4 volts corresponds to black. The output at the collectors of the transistors 424 is connected in series with the stylus power supply. The stylus current is then applied to the stylus through contacts 432-3 of function switch 432 when the switch is in the receive or R position.

The transceiver also includes a constant current supply 434 which is utilized to drive the lamp or light source for illuminating the document being scanned when the transceiver is operating in the transmitting mode. The constant current supply comprises transistors 436 and 438 connected in a Darlington configuration with the base of the transistor 436 connected to the potentiometer 439 to permit the adjustment of the lamp current. The use of a constant current source permits the illumination of a document to be maintained substantially constant without regulating the voltage of the lamp supply.

The power supply 427 is substantially conventional. A primary 440 is connected to a 117 volt AC, 60 Hz. power supply through a fuse 441 and function switch contacts 432-2 when the switch is in the receive (R) or transmit (T) mode. The power supply 427 comprises three secondaries 442, 444 and 446. Each of these secondaries 442, 444 and 446 are connected to diodes 448 for obtaining DC supply voltages. The power supply 427 includes filter capacitors 450 and a series of Zener diodes 452 for regulating the bias levels for the circuitry of the transceiver. A resistor 454 is connected in parallel with the filter capacitor 450 which is in turn connected in series with the stylus driver 330 and the stylus.

In order to control the application of power to the transceiver motor, a switch 460 is provided comprising switch contacts 460-1, 460-2 and 460-3. When the transceiver is not operating, the contacts of the switch 460 assume the position shown in FIG. 2a where the function switch 432 is shown in the transmit position. In order to start the motor, a surge of current is generated by transistors 462 and 464 in response to the output of the operational amplifier 422. This energizes a switch coil 466 which closes contacts 460-1 and 460-3 and moves the blade of switch 460-2 to the other position. The switch contacts 460-1 close the circuit to the motor while the switch contacts 460-2 close the circuit through the coil 466 to permit the motor to continue to run even though no surge of current is provided by the transistors 462 and 464. When a transceiver is acting as a receiver, the function switch is in the R position and the contacts 460-3 are closed to apply current to the stylus. Note that the head switch 230 is connected in series with the coil 466 to interrupt the power to the stylus by opening the switch contacts 460-3 or whenever an end-of-travel limit switch is triggered.

The operation of the transceiver circuitry will now be described both in respect to a transmitting transceiver as well as a receiving transceiver. At the transmitter, the function switch 432 is placed in a transmitting mode shown in FIG. 2a and a start switch is momentarily closed which applies a signal to the base of the transistor 372 which corresponds to a black signal from the preamplifier 302. As a result, the output from the VCO 304 increases to a frequency of 2,400 Hz. and this signal is applied to the input of the phase locked loop 322 over the line 470 and a resistor 472 in the receiving portion of the transmitting transceiver. The phase locked loop converts the 2,400 Hz. signal to a DC level corresponding to black. This in turn is applied to operational amplifier 422 to trigger the transistors 462 and 464 of the current generator associated with the coil 466 and thereby close switch 460-1 to apply power to the motor of the transmitting transceiver.

At a receiving transceiver, the function switch 432 is in the receive or R position. The black signal which is generated by the transmitting transceiver is applied to its acoustical coupler 308 and in turn received by the acoustical coupler 316 of the receiving transceiver. After amplification by the preamplifier 318, the black signal is demodulated at the phase locked loop 322, filtered and applied to the amplifier 422 of the receiving transceiver to trigger the transistors 462 and 464 associated with its own switch coil 466. As a result, the switch contacts 460-1 are closed in the receiving transceiver to apply power to the transceiver's motor.

It should therefore be clear that the motors of the transmitting and receiving transceivers will start at approximately the same time but there is no synchronizing of positions of the drums 12T and 12R driven by the motors nor is there any necessity for such synchronization in position since the copy medium forms a closed loop on the drum and the margin of the copy can therefore be suitably located before removing the copy medium from the drum regardless of the initial relative positions of the drums 12T and 12R. By utilizing synchronous motors 10T and 10 R which operate at a given frequency, e.g., 60 Hz., the speed of the drums may be maintained sufficiently close to assure a good copy of the original document through stability of frequency of the utility grid.

As the transmission proceeds, dark-light variations on the original document will be detected and transmitted from the transmitting transceiver to the receiving transceiver. As indicated in the foregoing, black signals have a predetermined frequency of 2,400 Hz. while white signals have a predetermined frequency of 1,500 Hz. It will of course be appreciated that any document being scanned will have varying degrees of darkness and lightness. The transceiver circuitry shown in FIGS. 2a and 2b is capable of detecting these varying degrees of lightness and darkness and transmitting frequencies between 1,500 Hz. and 2,400 Hz. Thus a gray scale is provided to assure a faithful reproduction of the original document at the copy medium.

As shown in FIGS. 2a and 2b, the VCO 304 in the transmitting portion of the transceiver and the VCO 324 in the receiving portion of the transceiver, are separate and distinct. In accordance with another important aspect of the invention, the VCO 304 and the VCO 324 may be one in the same as shown in FIG. 3 where the reference characters of FIG. 1 are utilized to identify the same components. By providing suitable switch means 474 and 476, the combined voltage controlled oscillator 304–324 may be utilized to modulate as well as demodulate the light-dark signals. When the transceiver is operating in the receiving mode, the switches 474 and 476 are in the position shown so as to place the VCO 304–324 in a feedback loop of the doubly balanced modulator 326 so as to demodulate the frequency modulated signal received. The resulting phase locked loop still serves to double the fundamental frequency of the FM signals to permit the notch filter 328 to substantially attenutate the signals in the 3,000 Hz. – 4,800 Hz. range without adversely affecting the high frequency changes in DC level of the signals applied to the stylus driver 330.

Although the transmitting and receiving transceivers have been described as identical, it will be understood that, a receiving transceiver constructed in accordance with this invention is capable of operating with a different type of transmitting transceiver such as the Model 400 Telecopier facsimile transceiver leased by the Xerox Corporation. Such a facsimile transceiver does require synchronization signals and it is possible to utilize the transceiver of this invention as disclosed herein to transmit to such a transceiver if pseudo-synchronization signals are also transmitted. It is possible to utilize the transceiver of this invention to receive from such a facsimile transceiver although the synchronization signals which are generated by that transceiver are not required.

FIG. 4 shows specific circuitry for the doubly balanced modulator 326 which may be utilized in place of the doubly balanced modulator provided by the Signetics Corporation integrated circuit chip NE 565. More specifically, the doubly balanced modulator 326 may comprise first and second pairs of transistors 500 (a & b) and 502 (a & b) having their emitters connected to the collectors of a pair of transistors 504 (*a & b*) respectively. The collectors of the transistors 500a and 502a are connected directly to the positive power supply +V. The collectors of transistors 500*b* and 502*b* are connected to the power supply +V through a load resistor 506, across which the output $V_0$ of the doubly balanced modulator is obtained.

One input $V_{i(s)}$ which is the FM signal input from the clipper 320 is applied across a resistor 507 to the base of the transistor 504a while the base of the other transistor 504b is connected directly to ground. The other input $V_{i(VCO)}$ which represents the output of the voltage controlled oscillator is applied across a resistor 508 which is connected between a tap 510 of a voltage divider comprising resistors 512 and 514 and the bases of transistors 500a and 502b. A bypass capacitor 516 is connected across the resistor 514.

In order to assure that the doubly balanced modulator operates in a doubly balanced mode a potentiometer 518 having a movable tap 520 connected to a power supply –V through a resistor 522 is connected to the emitters of the transistors 504a and 504b. The tap 520 is adjusted until the zero output is obtained when only the input $V_{i(VCO)}$ is applied to the modulator. With the tap 520 suitably positioned, application of the FM input $V_{i(s)}$ will result in the doubling of the fundamentals of the FM signal applied across the resistor 508.

Although a doubly balanced modulator has been shown and described, it will be appreciated that other forms of balanced modulators or other types of phase detectors may be utilized where the fundamental frequencies of the FM signals applied to the modulator are multiplied. Thus modulators which triple and quadruple these fundamentals may be utilized with appropriate adjustments in the filter 328 to assure attenuation of the tripled and quadrupled frequencies.

Although the mechanical scanning mechanism and the writing mechanism have not been shown and described, suitable scanning mechanisms and writing mechanisms will occur to those of ordinary skill in the art. A scanning and writing apparatus which is particularly well-suited for use with this invention is shown and described in the aforesaid copending application Ser. Nos. 333,616 and 333,615 which are incorporated herein by reference.

Although specific embodiments of the invention have been shown and described, other embodiments and modifications may occur to those of ordinary skill in the art and the appended claims are intended to cover any such modifications which fall within the true spirit and scope of the invention.

What is claimed is:

1. A facsimile system for producing a copy at one location which is a facsimile of a document located at another location comprising:

a transmitter including: means for detecting the light-dark
variations in a document, and means for generating FM signals having
different frequencies in response to the
detected light-dark variations;

a communications network coupled to the transmitter for transmitting FM signals; and a receiver coupled to the communications network and including;

a phase locked loop having a voltage controlled oscillator and a phase detector, said detector having a pair of inputs and an output, an FM signal representing the information content of the document being applied to one of the inputs of the oscillating output of the oscillator being applied to the other of the inputs so as to generate a demodulated signal at the detector output having an amplitude representing the lightdark variations in the document being scanned at the transmitter, the output of the detector also being coupled to the oscillator so as to control the frequency of the oscillator, said detector being characterized by at least doubling the fundamental frequency of the FM signal which pass to the output of the detector, and filter means coupled to the output of the detector for attenuating frequencies at least double the fundamental frequencies of the FM signals applied to said one input of said detector without substantial attenuation of frequencies less than the lowest fundamental of the FM signal supplied to said one input, and writing means coupled to the output of said filter means for writing on a copy medium information representing the information content of the document.

2. The system of claim 1 wherein said communications network comprises telephone lines.

3. The system of claim 1 wherein the fundamental frequencies of said FM signal lie substantially in an FM bandwidth of 1,500 Hz. to 2,400 Hz.

4. The apparatus of claim 1 wherein said FM signals have a bandwidth of substantially 1,500 Hz. – 2,400 Hz., said phase detector comprising a doubly balanced modulator so as to double the frequency of the fundamentals for the FM signals applied to said one input, and said filter means being adapted to substantially attenuate frequencies in a band of 3,000 Hz. – 4,800 Hz.

5. The facsimile system of claim 1 wherein said filter means substantially attenuates frequencies at least double the fundamental frequencies of the FM signal relative to the attenuation of the fundamental frequencies of the FM signal.

6. The system of claim 1 wherein said phase detector comprises a balanced modulator characterized by doubling the fundamental frequencies of the FM signal applied to said one input.

7. The system of claim 6 wherein said balanced modulator comprises a doubly balanced modulator.

8. A facsimile apparatus for use in a system for producing a copy at one location which is a facsimile of a document located at another location comprising:

means for demodulating FM signals representing light-dark variations in the document comprising a phase locked loop having a voltage controlled oscillator and a phase detector having a pair of inputs and an output with the FM signals applied to the one of said inputs and the oscillating output of said oscillator applied to the other of said inputs so as to generate a DC signal at said phase detector output having a level representing the lightdark variations in the document, said phase detector output also being coupled to said oscillator so as to control the frequency of said oscillator, said phase detector being characterized by at least doubling the fundamental frequencies applied to said one input;

filter means also coupled to the output of said phase detector so as to attenuate frequencies at least double the fundamental frequency of the FM signals applied to said one input without substantial attenuation of frequencies less than the lowest fundamental frequency applied to said one input; and writing means coupled to the output of said filter means for writing on a copy medium so as to reproduce the light-dark variations of the document.

9. The apparatus of claim 8 further comprising:

photodetector means for scanning a document when the apparatus is operating in a transmitting mode; and switch means permitting said voltage controlled oscillator to be coupled to the output of said photodetector for use in generating said FM signals when said apparatus is utilized in a transmitting mode.

10. The facsimile system of claim 6 wherein said filter means substantially attenuates frequencies at least double the fundamental frequencies of the FM signal relative to the attenuation of the fundamental frequencies of the FM signal.

* * * * *